United States Patent
Belsole

(10) Patent No.: US 7,895,918 B2
(45) Date of Patent: Mar. 1, 2011

(54) ERGONOMIC SAFETY STEERING WHEEL

(75) Inventor: Robert J. Belsole, Tampa, FL (US)

(73) Assignee: University of South Florida, Tampa, FL (US)

( * ) Notice: Subject to any disclaimer, the term of this patent is extended or adjusted under 35 U.S.C. 154(b) by 433 days.

(21) Appl. No.: 11/526,397

(22) Filed: Sep. 25, 2006

(65) Prior Publication Data
US 2007/0137414 A1 Jun. 21, 2007

Related U.S. Application Data

(60) Provisional application No. 60/720,078, filed on Sep. 23, 2005.

(51) Int. Cl.
*B62D 1/04* (2006.01)
(52) U.S. Cl. .......................................................... 74/552
(58) Field of Classification Search .................... 74/552, 74/558; D12/175
See application file for complete search history.

(56) References Cited

U.S. PATENT DOCUMENTS

| D199,562 S | * | 11/1964 | Le Rose | D12/175 |
| D206,522 S | * | 12/1966 | Stephenson et al. | D8/307 |
| 5,493,935 A | * | 2/1996 | Lemmen | 74/552 |
| 2004/0040779 A1 | * | 3/2004 | Bishop | 180/443 |

FOREIGN PATENT DOCUMENTS

DE 4314573 A1 * 12/1994 ................ 74/552

OTHER PUBLICATIONS

Ergonomic Steering Wheel marketing flyer printed by the University of South Florida; publicly available on Sep. 7, 2006.
Gentry, C. "Could wrist kink be thing of past?" *The Tampa Tribune*, Sep. 19, 2006.
* cited by examiner

*Primary Examiner* — Thomas R Hannon
*Assistant Examiner* — Phillip A Johnson
(74) *Attorney, Agent, or Firm* — Saliwanchik, Lloyd & Eisenschenk

(57) ABSTRACT

The present invention pertains to an ergonomic steering wheel rim designed to promote a neutral position to the forearm, reducing stress and fatigue by discouraging fixed wrist positions, i.e., flexion and ulnar deviation. The steering wheel rim of the invention provides a more comfortable driving position, reduces injury associated with airbag deployment, and reduces stress on hands and wrists. The steering wheel rim has one or more hand grip portions that deviate from the XY plane away from the driver. The present invention further concerns steering wheels comprising the rim of the invention and vehicles comprising the steering wheel of the invention.

30 Claims, 12 Drawing Sheets

Neutral Forearm

Supination

Pronation

Wrist Flexion

Wrist Extension

Ulnar Deviation

Radial Deviation

Ten Two Position

Left Eleven Position

Left Two Position

Airbag Injury

ERGONOMIC SAFETY STEERING WHEEL

CROSS-REFERENCE TO RELATED APPLICATION

The present application claims benefit of U.S. Provisional Application Ser. No. 60/720,078, filed Sep. 23, 2005, which is hereby incorporated by reference herein in its entirety, including any figures, tables, nucleic acid sequences, amino acid sequences, and drawings.

BACKGROUND OF THE INVENTION

In all but disabled drivers, the right and left hands provide the interface between the central nervous system and the machine's guidance or steering apparatus. Over the last fifty years, technical modifications of automotive steering systems have focused upon the linkage system, airbag deployment and decorative wheel designs. In only a few cases have design changes been directed toward hand positioning and comfort as it relates to ergonomics and safety.

A non-consecutive survey of 1000 drivers was completed, recording hand positions from drivers on highways in Tampa, Fla. Two surveyors observed the hand position on the steering wheel for drivers at speeds greater than 30 miles per hour. While alongside the subject's car, the position of the hand(s) on the steering wheel was observed. A predetermined code was dictated into a recorder based on the household clock orientation. Seventy five percent (750) of the observations returned only one hand on the steering wheel. Right and left hands are depicted in the chart of FIG. 2.

In the study, when two hands guided the automobile, they were balanced in 90% of the observations. When one and two hand positions were combined, 89% were noted at or above the horizontal midline (9 o'clock to 3 o'clock). The most common right one hand position was at 11 or 12 o'clock (75%). Thirty two percent of the left hands (one hand grip) were placed at 12 o'clock. The single left hand was positioned at 12, 11, 10 or 9 o'clock in 76% of the observations. Forty-one percent of the one hand steering grips crossed the vertical midline. Anytime the hand crosses the vertical midline to grasp the steering wheel, a potential dangerous situation occurs related to airbag deployment.

The forearm rotates from supination (palm up) (shown in FIG. 4) to pronation (palm down) (shown in FIG. 5). The mid-forearm position of rotation is termed neutral (shown in FIG. 3). For purposes of the descriptions herein, the forearm positions are described with the upper arms hanging loosely at the sides of the upper trunk. It is this reference that closely compares to the normal driving position, i.e., arms hanging loosely at the sides of the upper trunk.

At the wrist joint, the hand extends upward, flexes downward and deviates side-to-side. Ulna deviation occurs when the hand moves toward the small finger side in the plane of the forearm. Radial deviation is the opposite and the hand moves toward the thumb side in the plane of the forearm. Wrist movement is complex and brought about by muscle induced shifts and rotations of the small bones of the carpus which span between the forearm and hand. Carpal shifts and rotations are almost the same in wrist extension (shown in FIG. 7) and ulnar deviation (shown in FIG. 8). Likewise, the carpal movements are similar in wrist flexion (shown in FIG. 6) and radial deviation (shown in FIG. 9).

Industry has expended significant resources on ergonomic issues over the past 15 years. Most new technologies related to the upper extremity were directed toward design modifications of tools and input devices. Hardware stores display the advantages of multi-geared wrenches, angled saws, and hand-friendly drivers. High-tech retailers are very active in the promotion of ergonomic input devices for the home and office computer.

Most ergonomic and safety devices have been developed to diminish stresses in the extremity created by repetitive activity and static holding. Experimental research has shown well the harmful effects of wrist and forearm positions during holding and static hand positioning. Ergonomic experts recommend avoiding hand and wrist positions that create tension across joints and increase pressure on the tightly compartmentalized median nerve at the base of the palm. Pronation of the forearm, ulnar deviation of the palm and flexion of the wrist increase discomfort in users. Tissue tensions are high, which creates increased contact pressures in the joints and intraneural pressures across the median nerve within the carpal canal. Discomfort is usually experienced as joint aching and hand numbness. These symptoms are influenced by many exogenous factors, such as age, obesity, diabetes, arthritis and preexisting neck, shoulder and extremity pathology.

Technical modifications of computer interface devices that change the static hand(s) position(s) have filled retail stores. On many input boards the keys are angles outward to reduce ulnar deviation in the wrist. Portions of the boards are rolled or humped to reduce the amount of pronation of the forearms. The "vertical keyboard" takes this design to the extreme and is comprised of two half boards that permit entry with the forearms in the neutral position.

The most common situation that potentially fixes the hand (s) in a static position for varied time intervals occurs during driving. The forearm is fully pronated and the wrist is significantly ulnar deviated in the ten-two o'clock hands position. When the driver's hand crosses the vertical midline (12 o'clock to 6 o'clock), the forearms remain pronated but ulnar deviation is reversed to neutral. The limb, however, is in an unsafe position as it will be impacted by airbag deployment. Orthopedic, plastic, and hand surgeons are familiar with injuries to the hand and face that occur in front end collisions.

FIG. 10 shows the standard ten two hand position on the steering wheel. Forearms are fully pronated and the wrists are ulnar deviated. FIGS. 11 and 12 demonstrate the left hand on either side of the vertical equator of the steering wheel. Although the left two o'clock position straightens the ulnar deviated wrist, the position is potentially dangerous during airbag deployment.

During collision, the airbag drives the left hand that was held across the center of the wheel into the face of the driver, as shown in FIG. 13. It would be advantageous to have available a steering wheel design that allows the hands to be set in a more relaxed position for better comfort, and at the same time produce a safer driving environment. This steering wheel design should promote a more neutral position of the forearms and discourage fixed wrist positions in flexion and ulnar deviation. Additions to the commonly used steering wheels have been attempted but may add numerous other difficulties, including problems with actual steering and other safety issues.

BRIEF SUMMARY OF THE INVENTION

Changing the shape of the conventional steering wheel such that a portion deviates from the XY plane offers an attractive alternative. Subtle changes in the shape will not compromise driving techniques and accommodate anatomic variations in the geometry and elasticity of human tissues. The present invention pertains to a steering wheel rim occupying the XY plane, with one or more hand grip segments (preferably, two segments) of the rim deviating from the XY plane in the −Z direction (away from the user of the steering wheel, e.g., the driver of a vehicle).

Preferably, the one or more hand grip segments deviate from the XY plane, away from the operator of the steering wheel (in the −Z direction) so as to allow correction of ulnar deviation as compared with the standard steering wheel positioned in the XY plane. In an embodiment, the deviation of the one or more hand grip segments have a maximum deviation, or distance from the XY plane such that a line from the position of the steering wheel where the deviation begins to the maximum deviation forms a maximum deviation angle. This maximum deviation angle can vary in accordance with specific embodiments from approximately 6° to approximately 20°. Preferably, the maximum deviation angle is such that the average operator can grip the rim of the steering assembly of the invention and ulnar deviation is less than 20°. In one embodiment, the one or more hand grip segments deviate such that the maximum deviation angle is in the range of approximately 6° and approximately 20° from the XY plane. Preferably, the average user can grip the steering wheel at a location on the one or more hand grip segments such that ulnar deviation correction for the average operator is within the range of approximately 6° and approximately 20°. In another embodiment, the one or more hand grip segments deviate such that the maximum deviation angle is in the range of 8° and 15° from the XY plane. Preferably, in this embodiment, the average user can grip the steering wheel on the one or more hand grip segments such that the ulnar deviation correction for the average operator is within the range of 8° and 15°. In each embodiment, it is preferred that the total amount of deviation of each hand grip segment from the XY plane is achieved in the first half of the hand grip segment.

In preferred embodiments, the steering wheel rim of the invention has two hand grip segments, with one hand grip segment located within an area of the wheel rim extending from about the 1 o'clock to about the 5 o'clock position (from about 30° to about 150°) relative to the wheel rim when the wheel rim is in a neutral position and the other hand grip segment located within an area of the rim extending from about the 7 o'clock position to about the 11 o'clock position (from about 210° to about 330°) relative to the wheel rim when the wheel rim is in a neutral position. In particularly preferred embodiments, one hand grip segment extends from about the 1 o'clock to about the 5 o'clock position (from about 30° to about 150°) relative to the wheel rim when the wheel rim is in a neutral position and the other hand grip segment extends from about the 7 o'clock position to about the 11 o'clock position (from about 210° to about 330°) relative to the wheel rim when the wheel rim is in a neutral position.

The present invention further concerns steering wheel assemblies comprising the rim of the invention and vehicles comprising the steering wheel assemblies of the invention.

BRIEF DESCRIPTION OF THE DRAWINGS

FIG. 21 is similar to FIG. 15 but includes dashed lines representing the XY plane, and demonstrates the angle by which the hand grip segments can deviate from the XY plane.

DETAILED DESCRIPTION OF THE INVENTION

Most American cars allow adjustment of the orientation of the steering wheel to the driver's comfort. The plane of steering wheels can be changed from parallel to the dashboard to approximately 60-45 degrees to the dashboard. The wheel in the parallel position only tilts with its lower pole toward the driver. The operator's exact orientation to the steering wheel is also dependent on the angle of the driver's seat.

Figure 1:
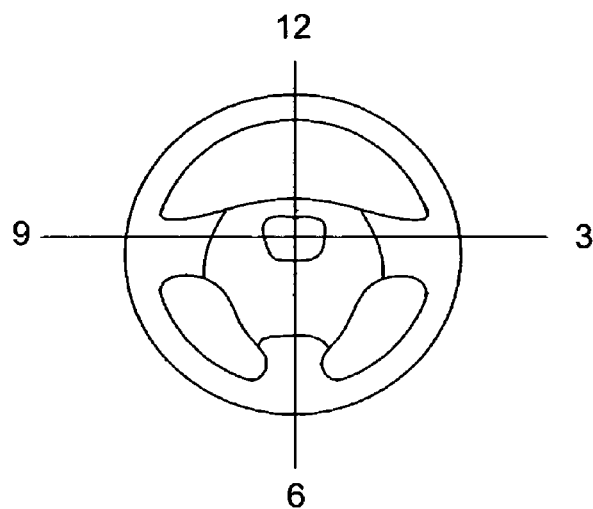
FIG. 1 shows a standard steering wheel arrangement in a household clock face orientation.
Figure 2:
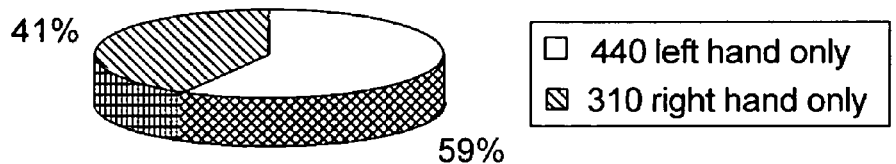
FIG. 2 is a pie chart showing that 75% of the observations returned only one hand on the steering wheel.
Figure 3:
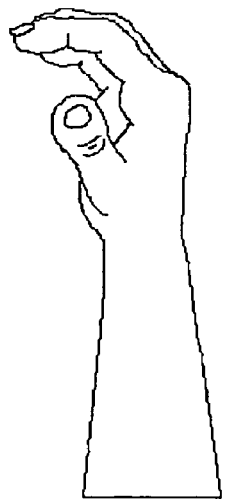
FIG. 3 shows a forearm in the neutral position.
Figure 4:
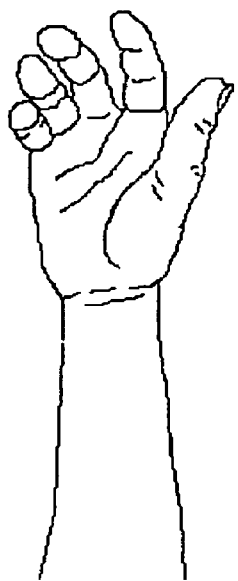
FIG. 4 shows a forearm in a position of supination (palm up).
Figure 5:
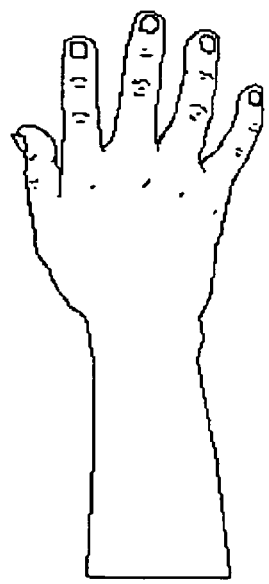
FIG. 5 shows a forearm in a position of pronation (palm down).
Figure 6:
FIG. 6 shows wrist flexion.
Figure 7:
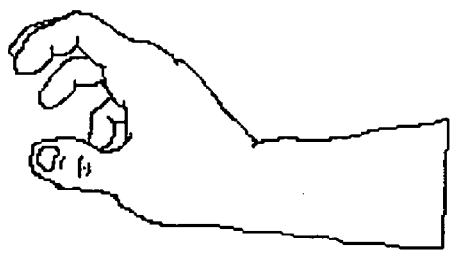
FIG. 7 shows wrist extension.
Figure 8:
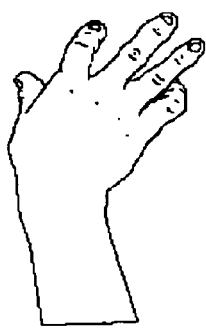
FIG. 8 shows ulnar deviation.
Figure 9:
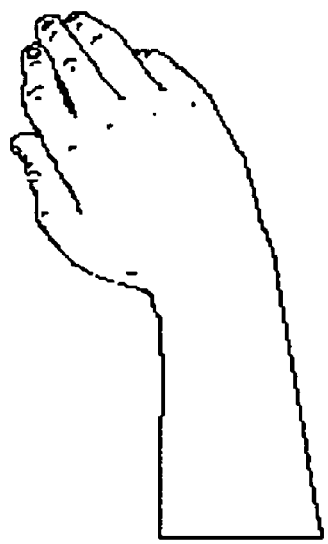
FIG. 9 shows radial deviation.
Figure 10:
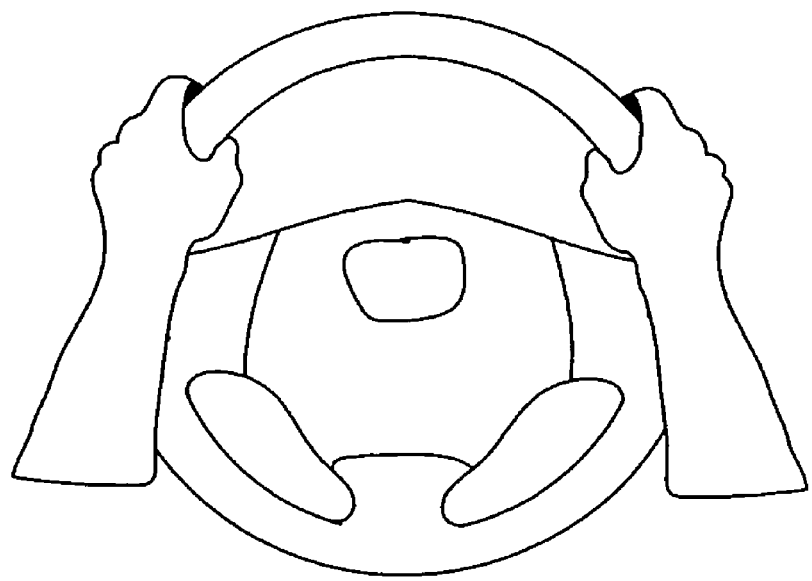
FIG. 10 shows the standard ten two hand position on a steering wheel, with forearms fully pronated and wrists and ulnar deviated.
Figure 11:
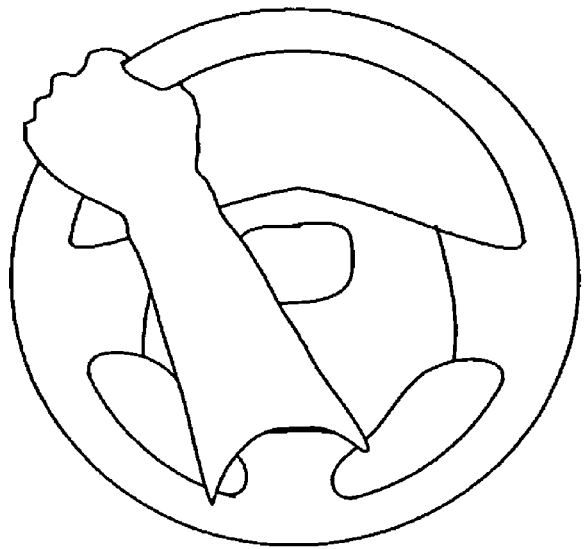
FIG. 11 shows the left hand on the left side of the vertical equator of the steering wheel, in the left eleven position.
Figure 12:
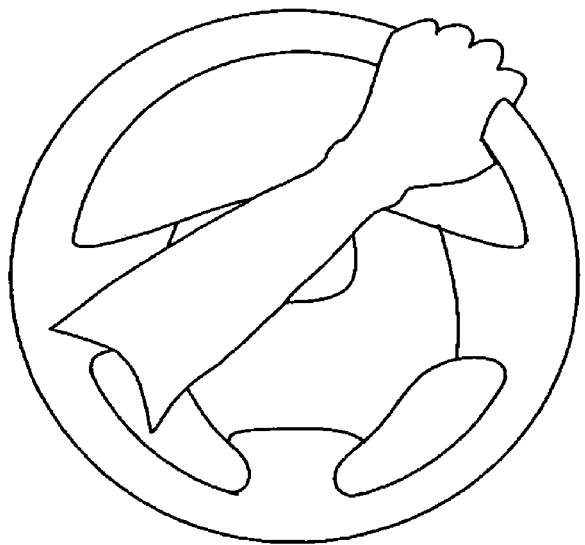
FIG. 12 shows the left hand on the right side of the vertical equator of the steering wheel, in the left two position.
Figure 13:
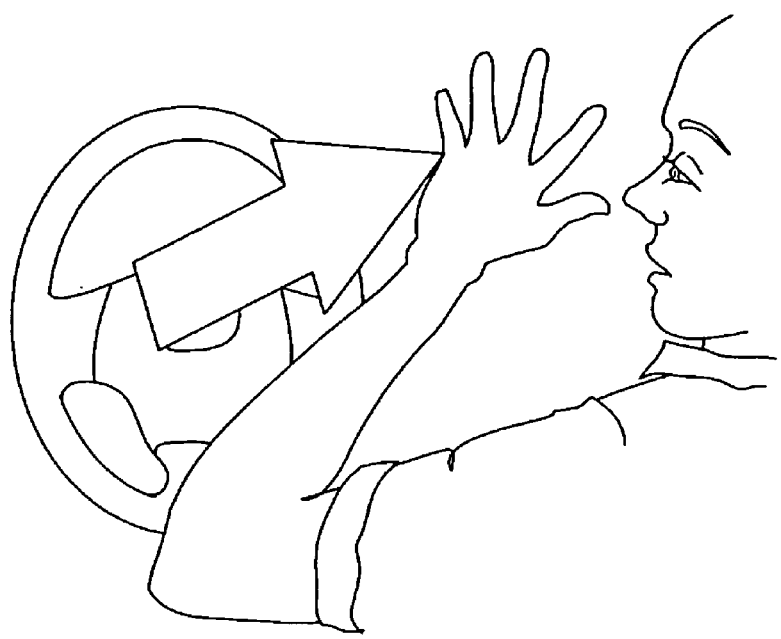
FIG. 13 demonstrates how, during collision, the airbag drives the left hand that was held across the center of the wheel into the face of the driver.
Figure 14:
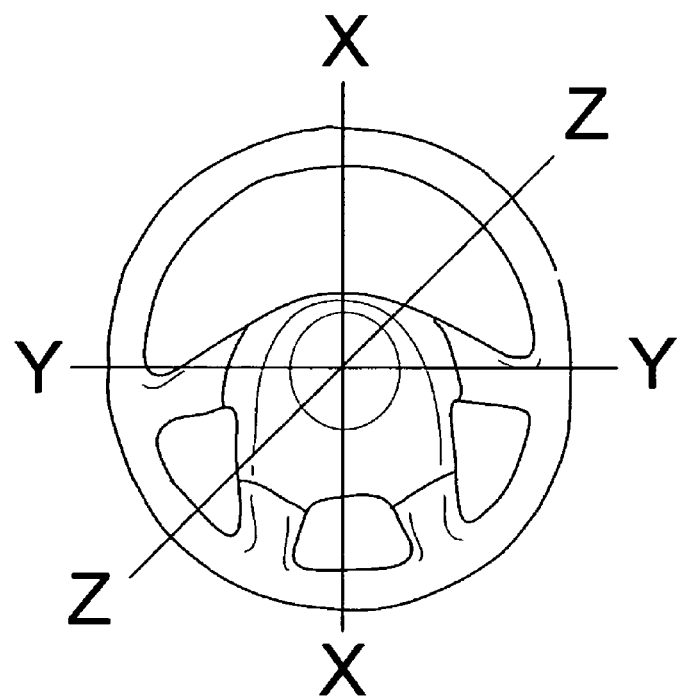
FIG. 14 shows the orientation of the typical automobile steering wheel, defined as an XY plane (about the Z axis), ZX plane (about the Y axis), and ZY plane (about the X axis), with the general shape of the steering wheel roughly circular in the XY plane.

The orientation of steering wheels, including the steering wheel of the invention, can be described with respect to an XY plane (about Z axis), ZX plane (about Y axis), and ZY plane (about X axis), as shown in FIG. 14. The operator turns the wheel in the XY plane and adjusts the position of the wheel in the ZX plane. In land vehicles, the steering wheel typically does not move along the Z axis. However, when used for aircraft, for example, the steering wheel can be pushed and pulled in the Z direction, making the aircraft go up or down.

The general shape of most automobile steering wheels is roughly circular in the XY plane. This plane is usually flat except for the diameter of the wheel rim itself which, although generally circular, may be varied for functional and decorative effects. Cushions and/or finger grooves can be added, for example. The whole wheel or parts of many vary in diameter dependent upon automobile make, steering model, and type.

Figure 15:
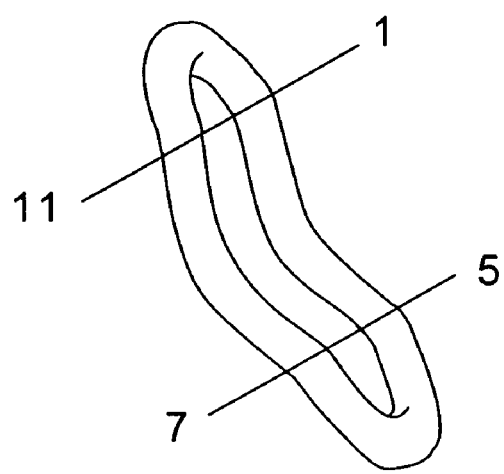
FIG. 15 shows the side view of an embodiment of the steering wheel rim of the invention, wherein the segment of the rim extending from the 7 o'clock position to the 11 o'clock position deviates and a segment of the rim extending from the 1 o'clock position to the 5 o'clock position deviate from the plane of the rest of the rim (i.e., those segments extending from the 11 o'clock position to the 1 o'clock position and from the 5 o'clock position to the 7 o'clock position).

The steering wheel rim of the invention has a shape that encourages the operator's hands to adopt a more natural and safe position. In preferred embodiments, the structure of the wheel is altered between the one o'clock and five o'clock positions on the right side and between the eleven o'clock and seven o'clock positions on the left side of the steering wheel, as represented generally in FIG. 15. The shape is changed in that the wheel rim deviates out of the XY plane within these segments, preferably curving out of the XY plane. In each embodiment, it is preferred that the total amount of deviation of each hand grip segment from the XY plane is achieved in the first half of the hand grip segment. In the preferred embodiments, across the second portion of each hand grip segment (3-5 o'clock, 7-9 o'clock), the wheel gradually returns to the XY plane. The top portion (11-1 o'clock) and bottom portion (7-5 o'clock) of the steering wheel rim are unchanged, occupying the XY plane.

Preferably, the total amount of deviation of each hand grip segment from the XY plane is achieved in the first half of the hand grip segment. Preferably, the one or more hand grip segments deviate such that the maximum deviation angle is up to approximately 20° from the XY plane, away from the operator of the steering wheel (in the –Z direction); in this way, the average operator can grip the rim of the steering assembly of the invention and achieve ulnar deviation of less than 20°. In one embodiment, the one or more hand grip segments deviate such that the maximum deviation angle is in the range of approximately 6° and approximately 20° from the XY plane; thus, ulnar deviation correction for the average operator is within the range of approximately 6° and approximately 20° when gripping the one or more hand grip segments. In another embodiment, the one or more hand grip segments deviate such that the maximum deviation angle is in the range of 8° and 15° from the XY plane; thus, ulnar deviation correction for the average operator is within the range of 8° and 15° when gripping the one or more hand grip segments. In this way, various embodiments of the subject invention provide a place on the one or more hand grip segments that allow a user to grip the hand grip segment and achieve an ulnar deviation correction of between approximately 6° and approximately 20° when compared to gripping the undeviated steering wheel in the XY plane. The location on the one or more hand grip segment for the user to achieve ulnar deviation correction will depend on the height of the steering wheel relative to, for example, the user's elbow, the tilt angle the steering wheel makes to vertical, and other factors that alter the angle the user's forehand makes to the steering wheel.

In preferred embodiments, the steering wheel of the invention has two hand grip segments, with one hand grip segment located within an area of the wheel rim extending from about the 1 o'clock to about the 5 o'clock position (from about 30° to about 150°) relative to the wheel rim when the wheel rim is in a neutral position and the other hand grip segment located within an area of the rim extending from about the 7 o'clock position to about the 11 o'clock position (from about 210° to about 330°) relative to the wheel rim when the wheel rim is in a neutral position. In particularly preferred embodiments, one hand grip segment extends from about the 1 o'clock to about the 5 o'clock position (from about 30° to about 150°) relative to the wheel rim when the wheel rim is in a neutral position and the other hand grip segment extends from about the 7 o'clock position to about the 11 o'clock position (from about 210° to about 330°) relative to the wheel rim when the wheel rim is in a neutral position.

Figure 20:
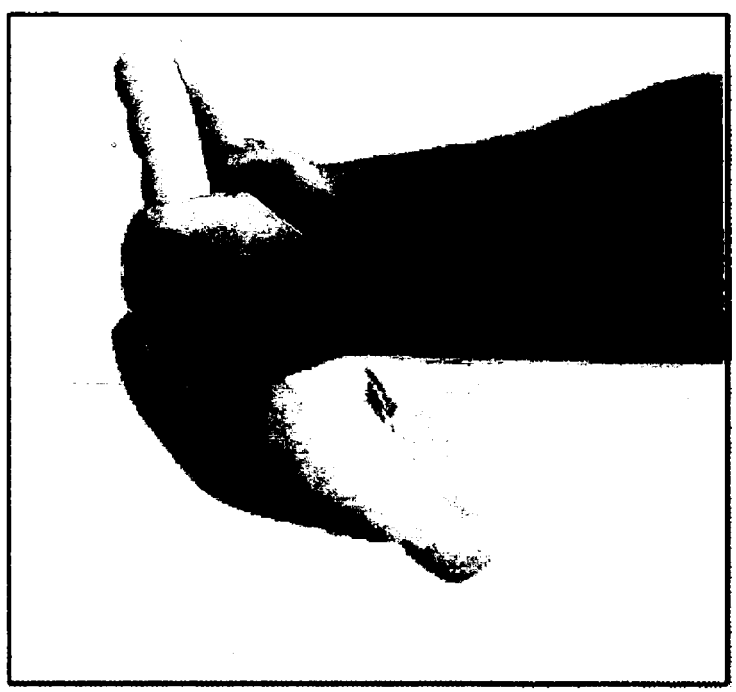
FIG. 20 is a photograph showing a side view of an embodiment of the steering wheel of the invention, with two hand grip segments curving out of the XY plane and away from the driver. The driver's hands are shown gripping the two hand grip segments of the steering wheel rim.
Figure 21:
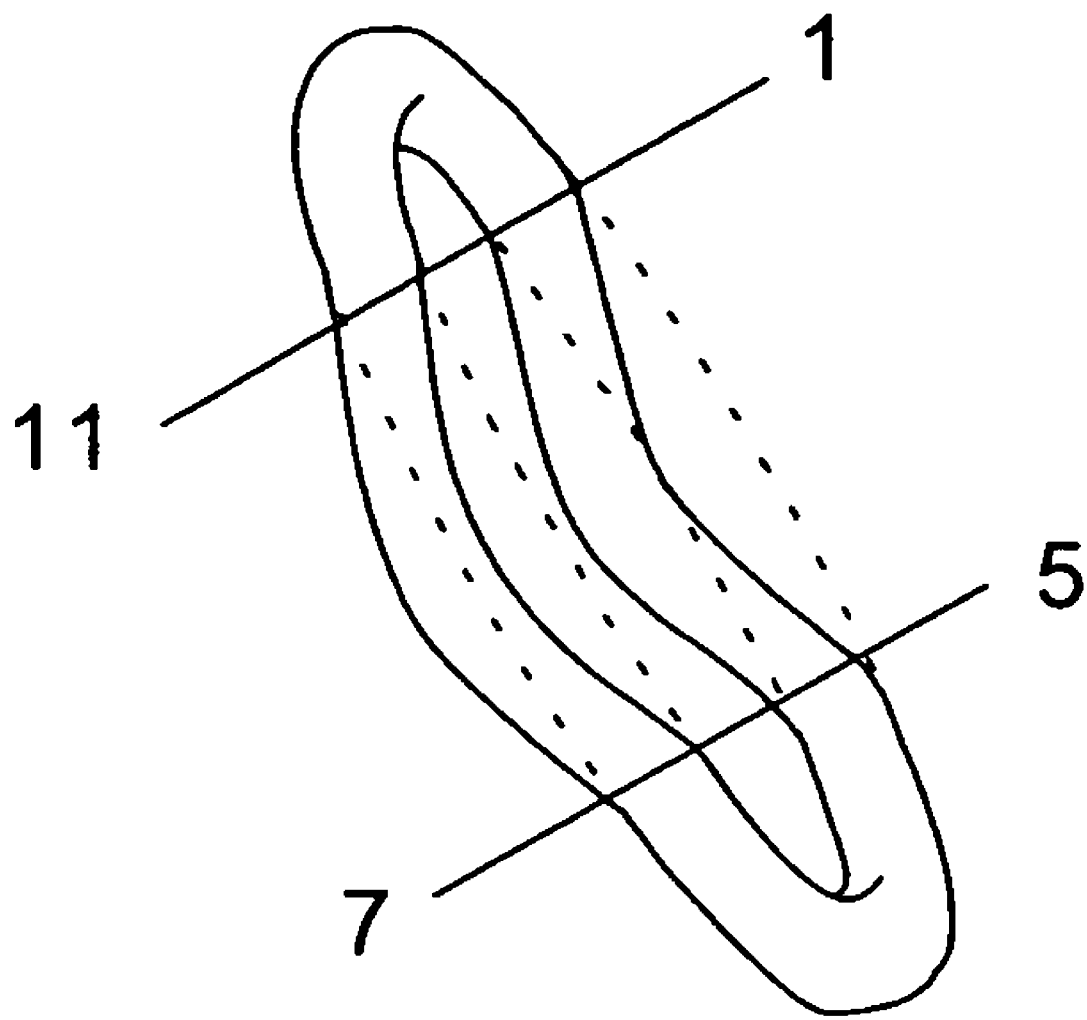
FIG. 21 shows the side view of an embodiment of the steering wheel rim of the invention, wherein the segment of the rim extending from the 7 o'clock position to the 11 o'clock position deviates and a segment of the rim extending from the 1 o'clock position to the 5 o'clock position deviate from the plane of the rest of the rim (i.e., those segments extending from the 11 o'clock position to the 1 o'clock position and from the 5 o'clock position to the 7 o'clock position).
Figure 22:
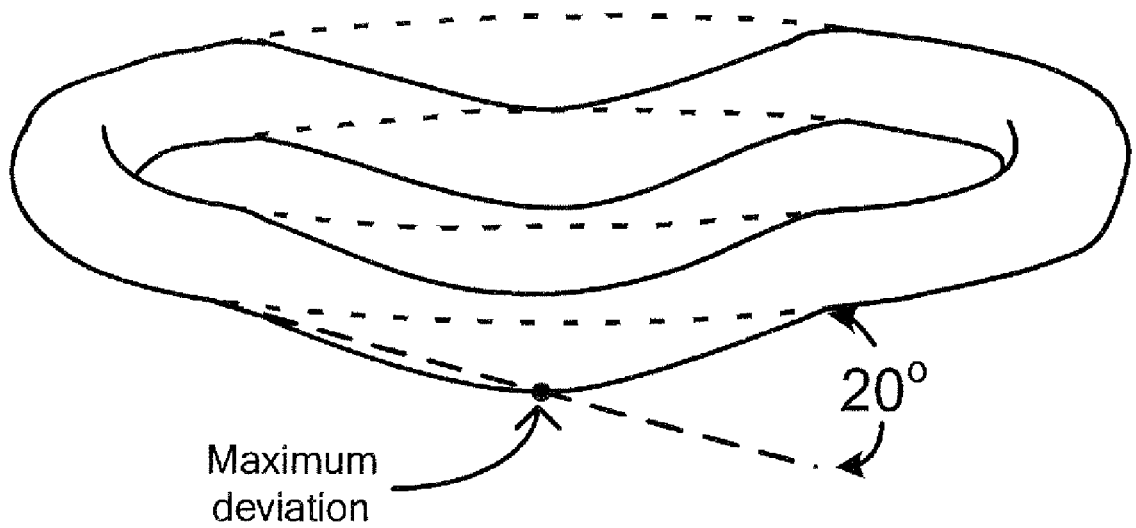
FIG. 22 shows the same embodiment of the steering wheel rim shown in FIG. 21, showing the maximum deviation, or distance from the XY plane such that a line from the position of the steering wheel where the deviation begins to the maximum deviation forms a maximum deviation angle. This maximum deviation angle can vary in accordance with specific embodiments from approximately 6° to approximately 20°.
Figure 23:
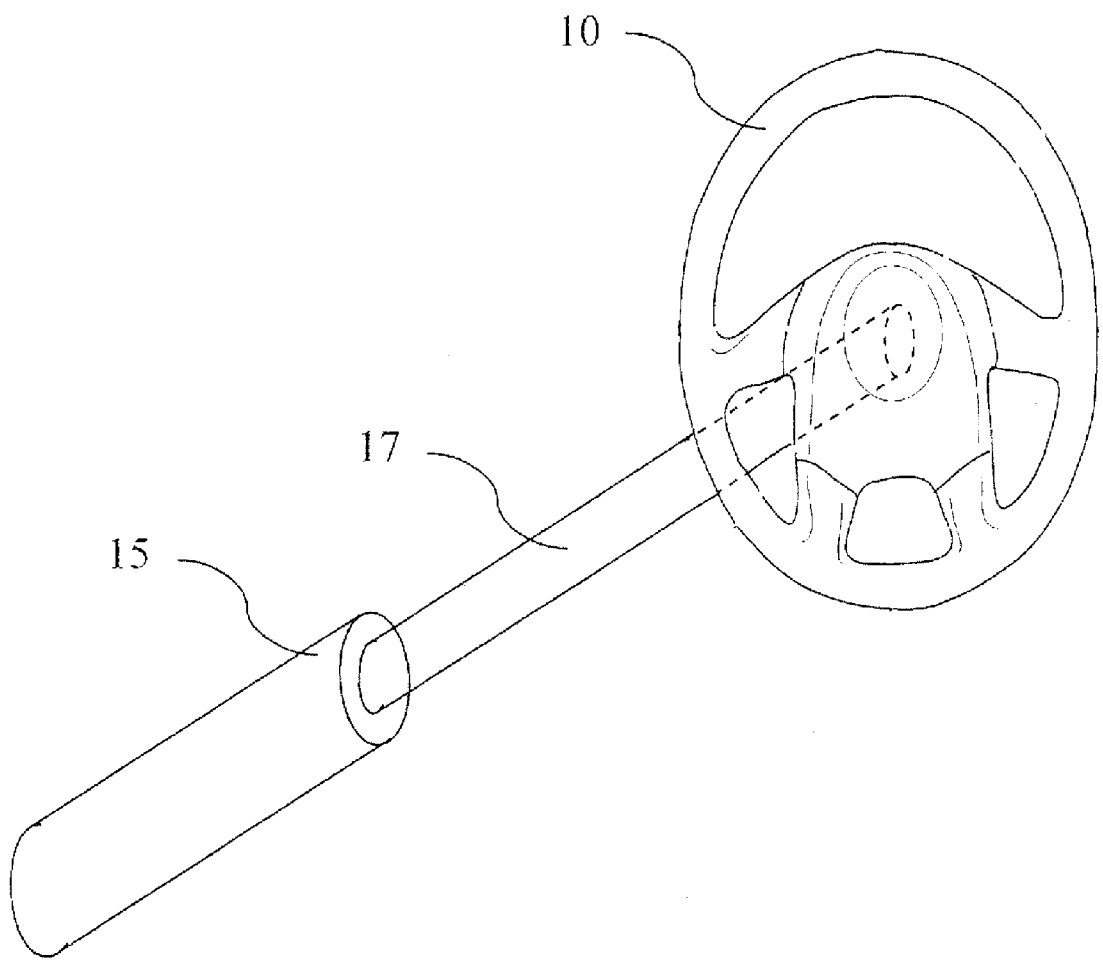
FIG. 23 shows a steering wheel 10 with a hub portion connected to a steering input shaft 17, with one end of the steering input shaft connected to the hub portion and the other end of the steering input shaft 17 connected to a steering gear 15.

Preferably, in the various embodiments, each hand grip segment is ergonomically contoured for interfacing with the hands and/or fingers of the operator. For example, the rear surface of each hand grip segment (the surface of the hand grip segment that is farthest from the operator) can have ridges and/or valleys (finger reliefs) for receiving the operator's fingers and/or thumb (being conformed thereto) and allowing for an easier grip, as shown in FIG. 20. As an additional ergonomic enhancement, each hand grip segment may include raised heel pads on the front surface (the surface facing the operator) for supporting the operator's palms.

As with conventional steering wheels, the steering wheel of the invention includes a rim as described above, and can have a hub portion, and one or more spokes connecting the steering wheel rim to the hub portion. Preferably, the hub portion is approximately central to the steering wheel rim or slightly offset toward the 12 o'clock or 6 o'clock position of the rim when in the neutral position, with the rear side of the hub portion (the side furthest away from the operator) in operative communication with one end of a steering input shaft 17. If one or more spokes are present, the spoke(s) preferably radiate outward from the hub portion to the rim. Preferably, the steering wheel of the invention is bilaterally symmetrical, with the hub portion bisecting the left and right halves of the steering wheel (i.e., with the hub portion horizontally centered). However, the hub portion need not be vertically centered, particularly in the case of aircraft or aircraft simulators. The hub portion can be any shape, such as a filled disc or ring shaped. Likewise, the spoke(s) can be any shape, and can be purely functional (e.g., serving only to support the rim), decorative, or both. Preferably, the hub and spoke(s) are arranged such that the steering wheel has bilateral symmetry when in a neutral position viewed head-on. Preferably, when present, the spoke(s) connects to the rim at a point outside any hand grip segment, so as not to interfere with the operator's grip on the rim. Preferably, the hub portion and spoke(s) occupy the XY plane, but may deviate therefrom.

When installed in most vehicles, the hub portion is operatively connected to a steering system through a rotatable steering input shaft 17, which may be contained within a steering column. Typically, one end of the steering input shaft 17 is connected to the hub portion and the other end of the steering input shaft 17 is connected to a steering gear 15. Preferably, two, three, four, or more spokes are present on steering wheel. If an even number of spokes are present on the wheel, there are preferably two or more pairs of spokes, with the spokes of each pair being collinear and arranged symmetrically on the wheel 10.

Figure 16:
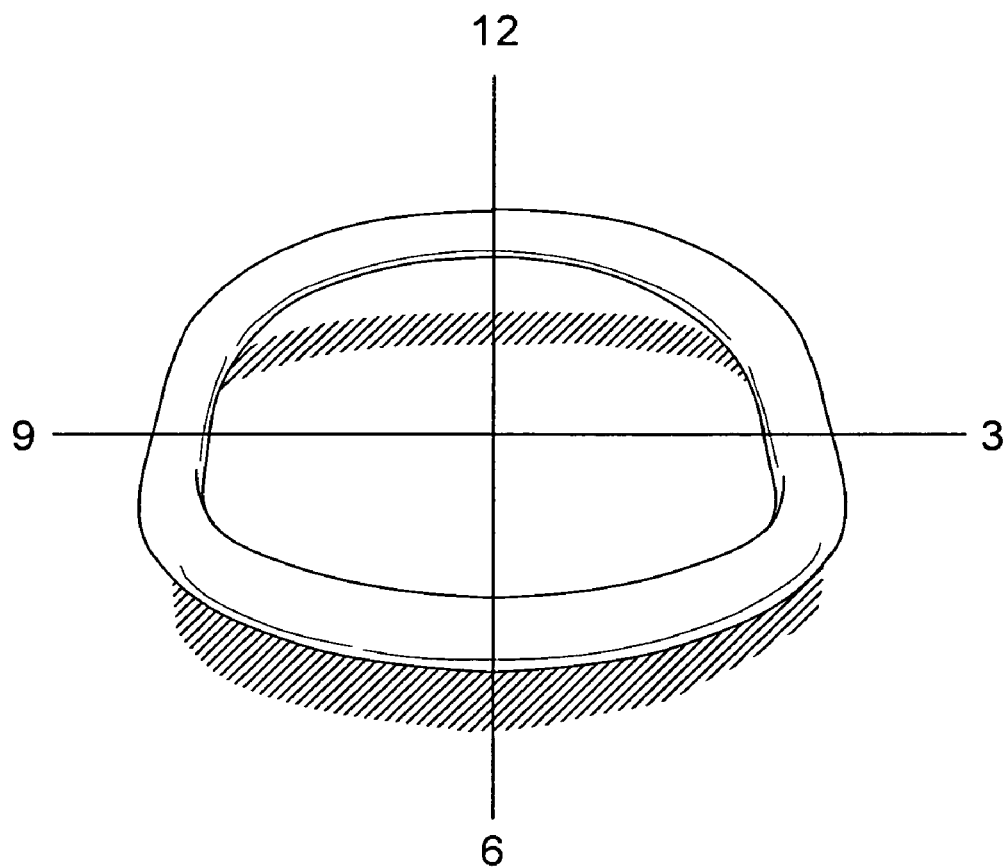
FIG. 16 shows an elevated view of an embodiment of the steering wheel rim of the invention resting on a flat surface (not shown), with the top and bottom portions of the rim (in the XY plane) elevated off the surface, and portions of the hand grip segments (deviating from the XY plane) contacting the surface.

FIG. 16 shows a steering wheel rim of the invention as it lies on a flat surface. The top and bottom portions are elevated off the flat surface because of the altered configuration. This steering wheel design promotes comfort and safety. During driving, the operators hands and wrists become less ulnar deviated and forearms more supinated.

Figure 17:
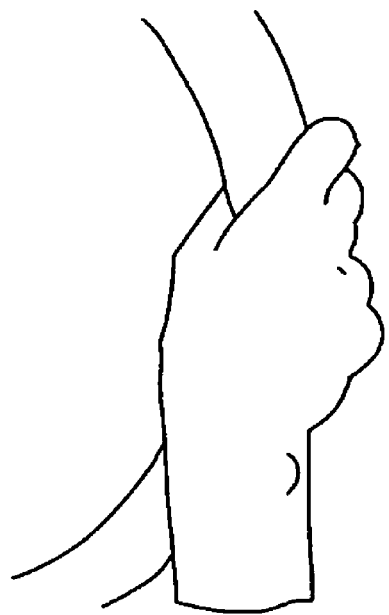
FIG. 17 demonstrates how a conventionally shaped steering wheel encourages pronated and ulnar deviated grip.
Figure 18:
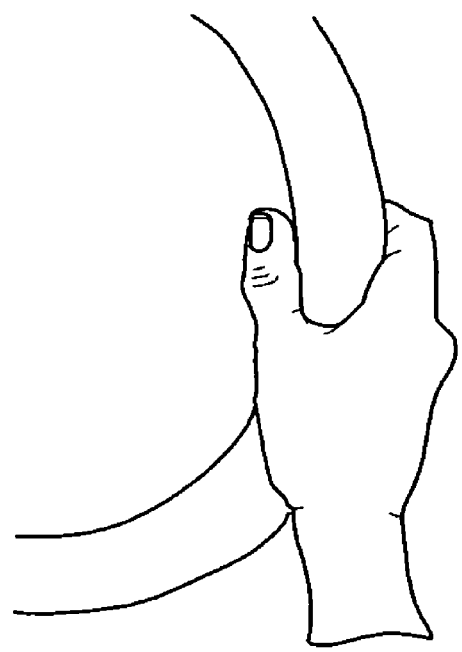
FIG. 18 demonstrates how the steering wheel of the invention helps bring the hand and wrist out of ulnar deviation and the forearm from pronation to a more neutral position, with the upper extremity in a more relaxed position and out of the way of airbag deployment.

FIG. 17 shows that a conventionally shaped steering wheel encourages a pronated and ulnar deviated grip. FIG. 18 shows that the shape of the steering wheel of the invention helps bring the operator's hand and wrist out of ulnar deviation and the forearm from pronation to a more neutral position. The upper extremity is in a more relaxed position and out of the way of airbag deployment.

Preferably, the hand grip segments follow a circumferential course, curving out of the XY plane. However, the deviation out of the XY plane does not have to be gradual or arcuate. The deviation from the XY plane can be acute. However, it is preferred that the hand grip segments deviate from the XY plan at an angle less than 20 degrees from the immediately adjacent portions of the rim that are in the XY plane.

The steering wheel rim and steering wheel assembly of the invention can be used to control the direction of any vehicle (e.g., cars, trucks, sport utility vehicles (SUVs), vans, buses, golf carts, tractors, tanks, all terrain vehicles, armored personnel carriers, high mobility multipurpose wheeled vehicles (HUMVs), heavy equipment such as fork-lifts, heavy-duty vehicles such as loaders and dump trucks, aircraft, boats, snowmobiles, jet skis, submarines). The steering wheel rim and steering wheel assembly of the invention can also be used as an interface or input device for computer simulators, computer games, or video/console games.

When viewed head-on, facing the wheel rim along the Z-axis, the wheel rim of the invention is preferably circular or ring-shaped, partially or fully circumscribing the center of the rim. However, although it is convenient to describe positions on the rim herein by clock face or by degrees around a center point, the wheel rim of the invention is not necessarily circular in shape. Thus, as used herein, the term "steering wheel" is intended broadly, to include a steering assembly having a rim with one or more hand grip portions that deviate from the XY plane. For example, the wheel rim can have segments that are straight (i.e., uncurved when the rim is viewed head-on). In one embodiment, the rim has a straight segment at the top portion (e.g., spanning 330° to 30°) and/or the bottom portion (e.g., spanning 150° to 210°) allowing greater movement of the operators legs and greater visibility over the rim. Preferably, the hand grip segments that deviate from the XY plane are curved, partially circumscribing the center of the rim; however, the hand grip segments can be straight, as described above. It is also preferred that the wheel rim is continuous; however, the rim can be discontinuous, i.e., not continuously or completely circumscribing the center of the steering wheel. For example, the wheel rim can have a discontinuity (gap) at one or more points on the rim. In one embodiment, the rim has discontinuities at the top and bottom portions of the rim (e.g., spanning 330° to 30° and 150° to 210°, respectively). The steering wheel of the invention can have a butterfly configuration. Butterfly steering wheels are often used for automobile racing.

In some embodiments, the steering wheel rim of the invention has the general shape of a "W", a "U", or a half-circle, resembling different types of control yokes that are found on aircraft. Each of the "W" and "U"-shaped embodiments have two substantially vertical portions, with each vertical portion terminating in a free end. Each vertical portion includes a hand grip segment deviating from the XY plane. The half-circle embodiment also has two free ends, with a cross piece attached to each free end. In each of these embodiments, the steering rim has two hand grip segments deviating from the XY plane. Preferably, the hand grip segments deviate such that the maximum deviation angle is less than approximately 20° from the XY plane, away from the operator of the steering wheel (in the −Z direction); in this way, the average operator can grip the rim of the steering assembly of the invention and achieve ulnar deviation correction up to 20° (the XY plane being 0° ulnar deviation). In one embodiment, the hand grip segments deviate such that the maximum deviation angle is in the range of approximately 6° and approximately 20° from the XY plane; thus, ulnar deviation correction for the average operator is within the range of approximately 6° and approximately 20°. In another embodiment, the hand grip segments deviate such that the maximum deviation angle is in the range of 8° and 15° from the XY plane; thus, ulnar deviation correction for the average operator is within the range of 8° and 15°. In each embodiment, it is preferred that the total amount of deviation of each hand grip segment from the XY plane is achieved in the first half of the hand grip segment. In an embodiment, the hand grip segments provide the user a variety of locations to grip the steering wheel to achieve an ulnar deviation correction of minus the maximum deviation angle up to the maximum deviation angle, allowing accommodation for steering wheel tilt and other factors.

The steering wheel rim, hub portion, and spoke(s) of the steering wheel of the invention can have a regular shaped or irregular cross-section. In one embodiment, the steering wheel rim has a cross-section that is circular, roughly circular, or oval in shape. As with other steering wheels, the steering wheel of the invention can exhibit some sidedeness. For example, finger grooves can be added present on the back of the wheel rim, preferably along at least a portion of the hand grip segment(s) or along the entire length of the hand grip segment(s). Various controls and ornaments can be present on the front, side, or rear surface of the rim, hub portion, or spoke(s), for example.

Figure 19:
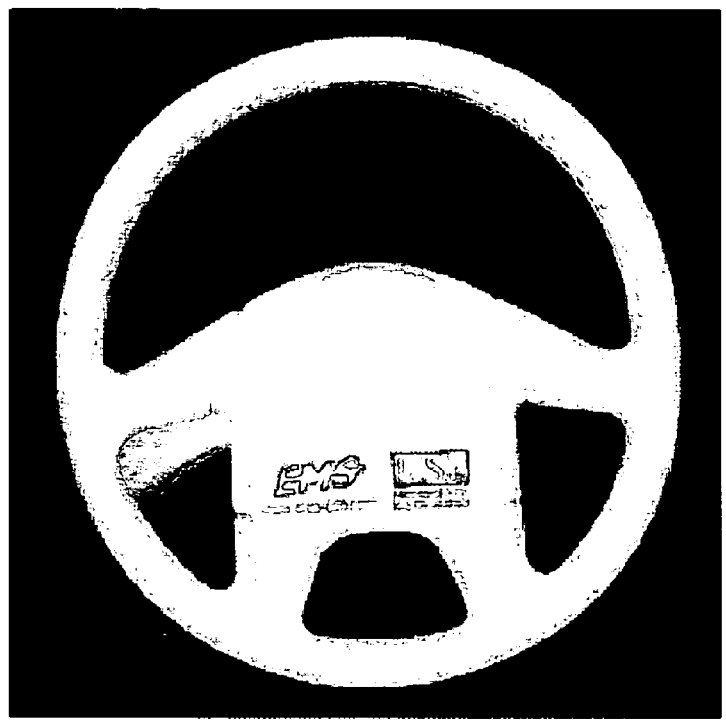
FIG. 19 is a photograph showing a head-on view of an embodiment of the steering wheel of the invention. Preferably, as shown in FIG. 19, when viewed head-on along the Z axis, the wheel rim is circular in shape, similar to most conventional steering wheels.

In one embodiment, the steering wheel of the invention has the configuration of that shown in FIGS. 19 and 20.

The steering wheel of the invention can include various ancillary features to enhance convenience. For example, manual controls (e.g., switches, buttons) for a horn, cruise control, an audio device, climate control, interior or exterior lights, windshield wipers, etc. can be located on the steering wheel, preferably on a spoke or the hub portion. Optionally, controls located on the steering wheel are redundant to controls located elsewhere, e.g., on a vehicle dashboard or center console.

The steering wheel of the invention can include an airbag deployment system. Typically, the airbag deployment system is provided in the hub portion of the steering wheel for selective deployment in certain hazardous conditions that may be detected by the vehicle's electronic control unit.

Optionally, the steering wheel rim of the invention includes a brodie knob (also known as a wheel spinner) that protrudes from the rim, and can be used by operators with disabilities, assisting them in turning the wheel.

If the steering wheel of the invention is employed for computer simulators or games, it can include a force or haptic feedback system to simulate the tactile feedback of a real vehicle operator (e.g., driver, pilot).

The steering wheel of the invention can be made from materials and manufactured by methods for making steering wheels that are known in the art. For example, the steering wheel of the invention can be made of plastic material, wood, metal, carbon fiber, fiberglass, or any combination thereof, and can be manufactured by die-casting or manufactured in separate parts which are then joined together to form a unit by welding, or other methods used to connect the selected materials. Although the rim, hub portion, and spoke(s) are generally rigid, each component may include weakenings to facilitate controlled deformation in the event of a collision and/or airbag deployment.

Any portion or all of the steering wheel can include an outer layer that can be any type of material that is desirable for interfacing with hands of the operator of the steering wheel, such as leather, synthetic materials, or any of a number of other materials.

The steering wheel of the invention can be used in conjunction with any of the various steering systems known in the art, such as wire steering, rack-and-pinion, recirculating ball, or rotating torque tube and gear box.

As used herein, the singular forms "a", "an", and "the" include plural reference unless the context clearly dictates otherwise. Thus, for example, a reference to "a segment" includes more than one such segment (e.g., two segments). A reference to "a spoke" includes more than one such spoke, and so forth.

All patents, patent applications, provisional applications, and publications referred to or cited herein, supra or infra, are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

I claim:

1. A steering wheel comprising a hub portion for receiving a first end of a steering input shaft from the −Z direction; and a rim connected to said hub portion, wherein said rim comprises two or more connecting segments that occupy an XY plane and two or more hand grip segments that extend between said two or more connecting segments, wherein said hub portion extends in the −Z direction relative to the XY plane, and wherein said two or more hand grip segments each comprise a laterally symmetric arc that deviates from said two or more connecting segments in the −Z direction.

2. The steering wheel of claim 1, wherein said rim is connected to said hub portion by one or more spokes.

3. The steering wheel of claim 2, wherein said one or more spokes connect to said rim outside of said two or more hand grip segments.

4. The steering wheel of claim 1, wherein said two or more hand grip segments comprise a first hand grip segment and a second hand grip segment symmetrically arranged on said rim, wherein said first hand grip segment is located within an area of said rim extending from the 1 o'clock to the 5 o'clock position relative to said rim when viewed from the +Z direction, and wherein said second hand grip segment is located within an area of said rim extending from the 7 o'clock position to the 11 o'clock position relative to said rim when viewed from the +Z direction.

5. The steering wheel of claim 4, wherein said first hand grip segment extends from the 1 o'clock to the 5 o'clock position and said second hand grip segment extends from the 7 o'clock position to the 11 o'clock position.

6. The steering wheel of claim 5, wherein said first and second hand grip segments have a maximum deviation angle from the XY plane of no greater than 20°.

7. The steering wheel of claim 5, wherein said first and second hand grip segments have a maximum deviation angle from the XY plane within the range of 6° to 20°.

8. The steering wheel of claim 5, wherein said first and second hand grip segments have a maximum deviation angle from the XY plane within the range of 8° to 15°.

9. The steering wheel of claim 4, wherein said first and second hand grip segments have a maximum deviation angle from the XY plane of no greater than 20°.

10. The steering wheel of claim 4, wherein said first and second hand grip segments have a maximum deviation angle from the XY plane within the range of 6° to 20°.

11. The steering wheel of claim 4, wherein said first and second hand grip segments have a maximum deviation angle from the XY plane within the range of 8° to 15°.

12. The steering wheel of claim 1, wherein said two or more hand grip segments have a maximum deviation angle from the XY plane of no greater than 20°.

13. The steering wheel of claim 1, wherein said two or more hand grip segments have a maximum deviation angle from the XY plane within the range of 6° to 20°.

14. The steering wheel of claim 1, wherein said two or more hand grip segments have a maximum deviation angle from the XY plane within the range of 8° to 15°.

15. The steering wheel of claim 1, wherein said two or more hand grip segments have finger grooves for receiving fingers of an operator and allowing for an easier grip when said steering wheel rim is in use.

16. The steering wheel of claim 1, wherein said rim is circular when viewed along the Z axis.

17. The steering wheel of claim 1, wherein said rim has only two of said hand grip segments.

18. The steering wheel of claim 1, wherein each of said two or more hand grip segments is a circular arc when viewed along the Z axis.

19. A vehicle comprising a steering wheel, wherein said steering wheel comprises a hub portion for receiving a first end of a steering input shaft from the −Z direction; and a rim connected to said hub portion, wherein said rim comprises two or more connecting segments that occupy an XY plane and two or more hand grip segments that extend between said two or more connecting segments, wherein said hub portion extends in the −Z direction relative to the XY plane, and wherein said two or more hand grip segments each comprise a laterally symmetric arc that deviates from said two or more connecting segments in the −Z direction.

20. The vehicle of claim 19, wherein said rim is circular when viewed along the Z axis.

21. The vehicle of claim 19, wherein said two or more hand grip segments have finger grooves for receiving fingers of an operator and allowing for an easier grip when said steering wheel rim is in use.

22. The vehicle of claim 19, wherein said steering wheel further comprises one or more spokes connecting said rim to said hub portion, and wherein said one or more spokes connect to said rim outside of said two or more hand grip segments.

23. The vehicle of claim 19, wherein said rim has only two of said hand grip segments.

24. The vehicle of claim 19, wherein each of said two or more hand grip segments is a circular arc when viewed along the Z axis.

25. A steering wheel assembly, comprising a steering wheel and a steering input shaft, wherein said steering wheel comprises a hub portion that is operatively connected to a first end of said steering input shaft, and wherein said steering wheel further comprises a rim connected to said hub portion, wherein said rim comprises two or more connecting segments that occupy an XY plane and two or more hand grip segments that extend between said two or more connecting segments, wherein said hub portion extends in the −Z direction relative to the XY plane, and wherein said two or more hand grip segments each comprise a laterally symmetric arc that deviates from said two or more connecting segments in the −Z direction.

26. The steering wheel assembly of claim 25, wherein said rim is circular when viewed along the Z axis.

27. The steering wheel assembly of claim 25, further comprising a steering gear attached to a second end of said steering input shaft.

28. The steering wheel assembly of claim 25, wherein said two or more hand grip segments have finger grooves for receiving fingers of an operator and allowing for an easier grip when said steering wheel rim is in use.

29. The steering wheel assembly of claim 25, wherein said rim has only two of said hand grip segments.

30. The steering wheel assembly of claim 25, wherein each of said two or more hand grip segments is a circular arc when viewed along the Z axis.

* * * * *